United States Patent
Onishi et al.

(10) Patent No.: US 8,378,729 B2
(45) Date of Patent: Feb. 19, 2013

(54) SIGNAL CONTROL DEVICE

(75) Inventors: Yukio Onishi, Nagoya (JP); Shigeki Katsumata, Miyoshi (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 281 days.

(21) Appl. No.: 12/991,296

(22) PCT Filed: Jun. 2, 2009

(86) PCT No.: PCT/JP2009/060027
§ 371 (c)(1),
(2), (4) Date: Nov. 5, 2010

(87) PCT Pub. No.: WO2009/150957
PCT Pub. Date: Dec. 17, 2009

(65) Prior Publication Data
US 2011/0057701 A1    Mar. 10, 2011

(30) Foreign Application Priority Data
Jun. 13, 2008 (JP) ................. 2008-154926

(51) Int. Cl.
*H03H 11/16* (2006.01)
*H03K 5/13* (2006.01)
(52) U.S. Cl. ........ 327/231; 327/172; 327/175; 327/237; 327/238
(58) Field of Classification Search .............. 327/172, 327/175, 231, 237, 238
See application file for complete search history.

(56) References Cited

U.S. PATENT DOCUMENTS

| 6,236,583 | B1 * | 5/2001 | Kikuchi et al. | 363/132 |
| 7,265,522 | B2 * | 9/2007 | Sutardja et al. | 323/222 |
| 2005/0052163 | A1 | 3/2005 | Sutardja et al. | |

FOREIGN PATENT DOCUMENTS

| DE | 11 2008 000 189 T5 | 12/2009 |
| JP | 9-215322 A | 8/1997 |
| JP | 2002-354798 A | 12/2002 |
| JP | 2004-208413 A | 7/2004 |
| JP | 2004-357388 A | 12/2004 |
| JP | 2006-217759 A | 8/2006 |
| JP | 2008-182815 A | 8/2008 |

OTHER PUBLICATIONS

Office Action issued Jul. 23, 2012 in DE 11 2009 001 399.6 and English translation thereof.

* cited by examiner

*Primary Examiner* — John Poos
(74) *Attorney, Agent, or Firm* — Kenyon & Kenyon LLP (57) ABSTRACT

A signal control device controls the period of a three-phase signal used to control a three-phase high-voltage converter. An arithmetic unit of the signal control device determines a timing for changing the period for each phase so that the period of the signal for a V phase or a W phase is changed at the point when the phase difference between a U phase and the V or W phase reaches a prescribed phase difference after the period of the signal for the U phase has been changed. A control unit performs control such that the signal period for each phase is changed at the timing determined by the arithmetic unit.

5 Claims, 7 Drawing Sheets

SIGNAL CONTROL DEVICE

This is a 371 national phase application of PCT/JP2009/060027 filed 2 Jun. 2009, claiming priority to Japanese Patent Application No. JP 2008-154926 filed 13 Jun. 2008, the contents of which are incorporated herein by reference.

TECHNICAL FIELD

The present invention relates to control of signals for three phases used to control a three-phase high-voltage converter.

BACKGROUND ART

In a three-phase high-voltage converter mounted in, for example, a fuel cell hybrid vehicle, when currents flowing through three phases reach a peak at the same timing, an excessive current flows through circuits. Thus, the three-phase high-voltage converter is controlled so as to set the phase difference between the currents flowing through the respective three phases to $2\pi/3$ in order to reduce circuit loads.

As a conventional technique in which, in the control of an N-phase converter, the phases of currents flowing through the respective phases are shifted from one another by $2\pi/N$, for example, Patent Document 1 discloses a multiphase multiple chopper apparatus including (m) chopper devices connected together in parallel. In the multi-phase multiple chopper apparatus, each chopper device is responsible for 1/m of the total current supplied to an output load, and the phases of the currents each flowing between the chopper devices are shifted from one another by $2\pi/m$. Furthermore, Patent Document 2 discloses a voltage raising and lowering converter providing the function of raising a lower voltage by a factor of (n) to obtain a higher voltage and the function of lowering the higher voltage by a factor of 1/n to obtain the lower voltage. In the voltage raising and lowering converter, the number of phases is an integral multiple N of an integer N' closest to (n), and N voltage raising and lowering choppers connected together in parallel are combined together to form an N-phase N-multiple circuit. In this case, currents flowing through the respective phases are controlled to be shifted from one another by $2\pi/N$.

An output voltage from the multiphase converter as described above and currents flowing through circuits in the converter are generally controlled by using pulse width modulation (PWM) signals to controllably power on and off semiconductor switching elements such as IGBTs (Insulated Gate Bipolar Transistors) included in the voltage raising and lowering circuit in the multiphase converter. For example, there has been disclosed a technique which involves, in controlling a three-phase high-voltage converter, setting the phase difference between currents flowing through the respective phases by performing control such that the phase difference between PWM signals allowing driving of the respective semiconductor switching elements for three phases is set to $2\pi/3$.

Furthermore, in the control of the three-phase high-voltage converter, the carrier period of each PWM signal may need to be changed while the converter is in operation. For example, if the duty ratio of the PWM signal remains high (for example, at least 80%) for at least a given time, the semiconductor switching elements may disadvantageously generate heat as a result of heat loss. With the duty ratio of the PWM signal constant, an increase in the carrier period of the PWM signal reduces the heat generated by the semiconductor switching elements. Thus, in the control of the three-phase high-voltage converter, if the duty ratio of the PWM signal is expected to remain high for at least a given time in connection with, for example, a target output voltage or if the temperature of the IGBTs increases, the carrier period may be controlled to be changed to a value larger than the current one in order to reduce the heat generated by the semiconductor switching elements.

The generation of PWM signals and the control of period and phase of the PWM signal can be carried out using an arithmetic device such as a CPU (Central Processing Unit). For example, a carrier signal used to generate a PWM signal can be generated by repeating a process of allowing a timer counter of the CPU to start counting and initializing the counter value when the counter value reaches a preset maximum value. The carrier period is defined by the maximum counter value. Hence, the carrier value can be changed by changing the maximum value.

PRIOR ART DOCUMENTS

Patent Document

Patent Document 1: Japanese Patent Laid-Open No. 9-215322
Patent Document 2: Japanese Patent Laid-Open No. 2004-357388

SUMMARY OF THE INVENTION

Problems to be Solved by the Invention

As described above, in the control of a three-phase high-voltage converter, it may be necessary to set the phase difference between currents flowing through the respective three phases to $2\pi/3$ and to change the carrier periods of PWM signals allowing the driving of semiconductor switching elements for the three phases.

However, in such conventional techniques as described in Patent Documents 1 and 2, when the carrier periods of driving signals for N phases are constant, the phase differences among the currents flowing through the respective phases are controlled to be held. Thus, in the control of the three-phase high-voltage converter, even with such conventional techniques as described in Patent Documents 1 and 2, if the carrier periods of the PWM signals for the three phases are changed, the phase differences among the PWM signals for the respective three phases are not necessarily held.

Means for Solving the Problems

An aspect of the present invention provides a signal control device configured to control periods of signals for three phases used to control a three-phase high-voltage converter, the apparatus being characterized by comprising an arithmetic unit which, when the period of each of the signals for the respective three phases is changed, determines a timing at which the period of the signal is changed based on the ratio of the changed period to the unchanged period, the arithmetic unit determining the timing for each of the three phases such that after the signal for a first phase of the three phases is changed, when a phase difference between the signal for the first phase and a signal for a second phase of the three phases or a signal for a third phase of the three phases reaches a predetermined value, the period of the signal for the second or third phase is changed, and a control unit which performs control such that the period of the signal for each of the three phases is changed at the timing determined by the arithmetic unit.

EMBODIMENTS FOR CARRYING OUT THE INVENTION

Figure 1:
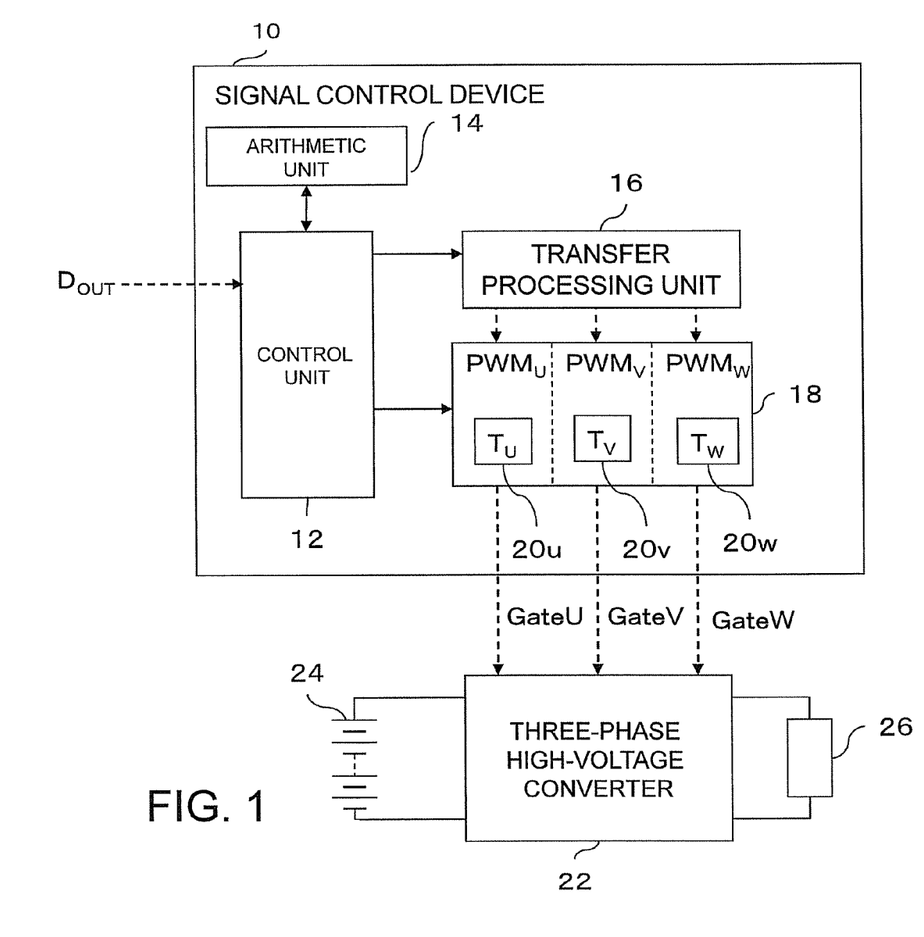
FIG. 1 is a block diagram showing an example configuration of a signal control device according to an embodiment of the present invention.

FIG. 1 is a block diagram showing an example configuration of a signal control device according to an embodiment of the present invention. As shown in FIG. 1, a signal control device 10 controls signals for three phases used to control a three-phase high-voltage converter 22. The signal control device 10 includes a control unit 12, an arithmetic unit 14, a transfer processing unit 16, and a PWM signal generating unit 18.

The control unit 12 receives a signal $D_{OUT}$ indicative of a target output. In accordance with the received signal $D_{OUT}$, the control unit 12 controls the arithmetic unit 14, the transfer processing unit 16, and the PWM signal generating unit 18 so as to allow generation of PWM signals GateU, GateV, and GateW serving to control the operations of the respective phases (U phase, V phase, and W phase) of the three-phase high-voltage converter 22. The arithmetic unit 14 receives an instruction from the control unit 12 to perform operations required for processing in the transfer processing unit 16 and the PWM signal generating unit 18. The transfer processing unit 16 receives an instruction from the control unit 12 to transfer, to the PWM signal generating unit 18, control signals allowing control of the period and phase of each of the signals for the three phases generated by the PWM signal generating unit 18. The PWM signal generating unit 18 receives an instruction from the control unit 12 and the control signals from the transfer processing unit 16 to generate the PWM signals GateU, GateV, and GateW. The PWM signal generating unit 18 outputs the generated signals to the three-phase high-voltage converter. The PWM signal generating unit 18 includes carrier period setting registers 20u, 20v, and 20w configured to store set values for the carrier periods for the U, V, and W phases. The processing executed by the control unit 12, the arithmetic unit 14, the transfer processing unit 16, and the PWM signal generating unit 18 will be described below in detail.

The signal control device 10 can be implemented using a microcomputer or the like. That is, a storage device (not shown in the drawings) in a microcomputer is configured to store a program describing the flow of the processing executed by the control unit 12, the arithmetic unit 14, the transfer processing unit 16, and the PWM signal generating unit 18 as described below, as well as numerical values required for the processing, and the like. A CPU in the microcomputer reads and executes the program to allow the microcomputer to function as the signal control device 10.

The three-phase high-voltage converter 22 operates in accordance with the PWM signals GateU, GateV, and GateW from the signal control device 10. The signal control device 10 thus converts the voltage level of a voltage supplied by a DC power source 24 and supplies the resultant voltage to a load 26. The three-phase high-voltage converter 22 is mounted in, for example, a fuel cell hybrid car. If the three-phase high-voltage converter 22 is mounted in a fuel cell hybrid car, a secondary cell mounted in the vehicle is connected to the three-phase high-voltage converter 22 as the DC power source 24. A fuel cell stack used as a driving source for the vehicle is connected to the three-phase high-voltage converter 22 as the load 26.

Figure 2:
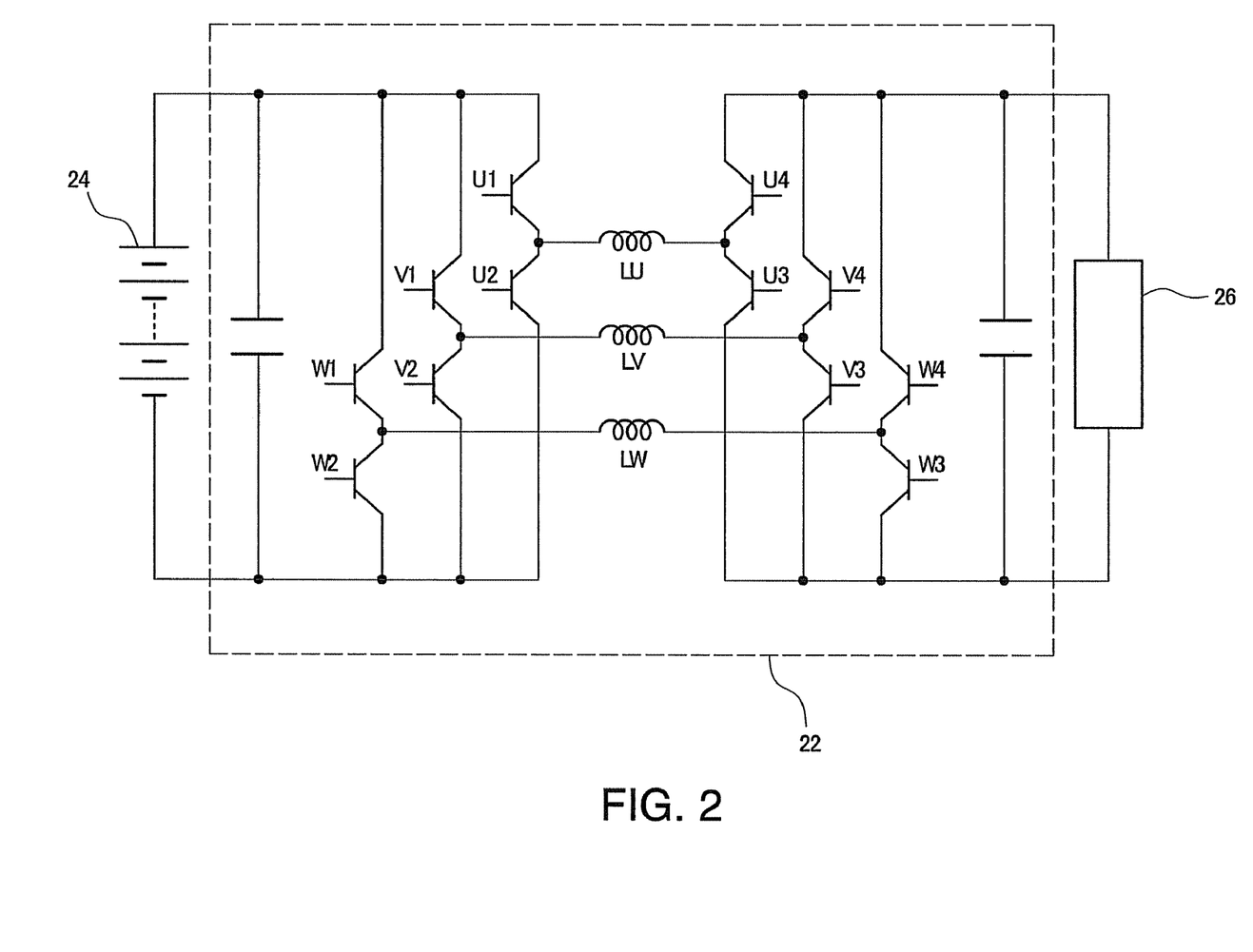
FIG. 2 is a circuit diagram showing an example of a voltage raising circuit in a three-phase high-voltage converter.

FIG. 2 shows an example of the voltage raising circuit included in the three-phase high-voltage converter 22. In the circuit shown in FIG. 2, reactances LU, LV, and LW for the U, V, and W phases, respectively, are connected to IGBTs U1, U2, U3, and U4 configured to drive the U phase, IGBTs V1, V2, V3, and V4 configured to drive the V phase, and IGBTs W1, W2, W3, and W4 configured to drive the W phase. The IGBTs, configured to drive the respective phases, are driven in accordance with the PWM signals GateU, Gate V, and GateW from the PWM signal generating unit 18 of the signal control device 10. Given that the PWM signals GateU, GateV, and GateW are logical signals indicative of an ON state (logical high) or an OFF state (logical low), logical expressions for driving of the respective IGBTs may be set to be, for example, U1=U3=GateU, U2=U4=NOT (GateU), V1=V3=GateV, V2=V4=NOT (GateV), W1=W3=GateW, and W2=W4=NOT (GateW).

<Basic Processing>

First, basic processing executed by the signal control device 10 will be described: the basic processing is executed to (1) generate PWM signals, to (2) change the carrier periods of the PWM signals, and to (3) set phase difference among the PWM signals for the three phases.

(1) Generation of PWM Signals

The control unit 12 receives a signal $D_{OUT}$ indicative of a target output. Then, in accordance with the received signal $D_{OUT}$, the control unit 12 determines, for example, the carrier periods of required PMN signals to give instructions to the transfer processing unit 16 and the PWM signal generating unit 18. The control unit 12 writes values corresponding to the determined carrier periods, to the carrier period setting registers 20u, 20v, and 20w for the respective phases.

Figure 3:
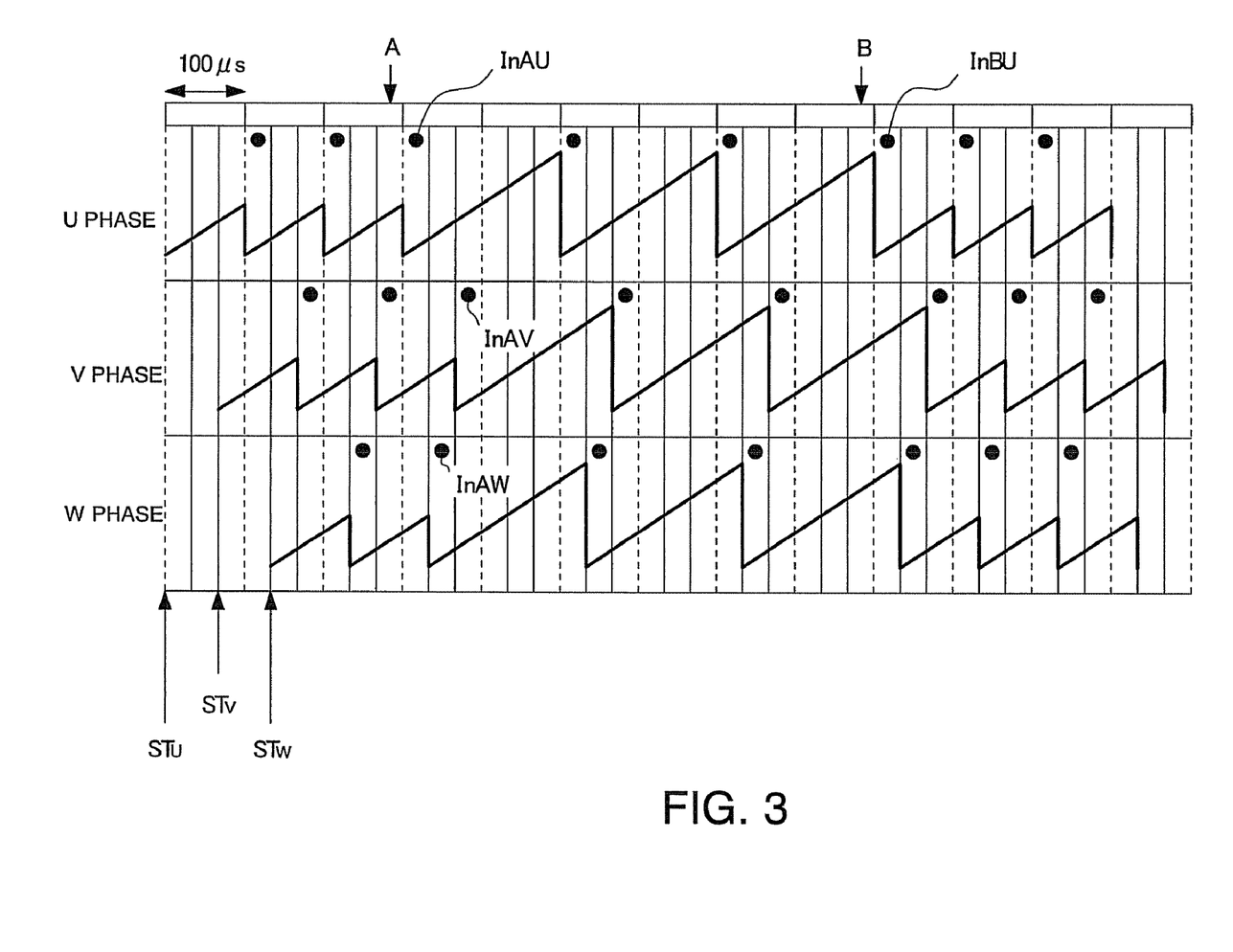
FIG. 3 is a diagram showing an example of the waveforms of carrier signals for three phases.

The PWM signal generating unit 18 allows a timer counter (not shown in the drawings) to start counting for each of the three phases, the U, V, and W phases. When the counter value reaches the value stored in one of the carrier period setting registers 20u, 20v, and 20w for the respective phases, the PWM signal generating unit 18 initializes the counter value. The PWM signal generating unit 18 repeats this process to generate carrier signals for the respective phases. FIG. 3 shows an example of the waveforms of carrier signals for the three phases generated by the PWM signal generating unit 18. The PWM signal generating unit 18 also generates pulse signals allowing the PWM signals GateU, GateV, and GateW to be generated through comparison with the carrier signals. The transfer processing unit 16 transfers a control signal allowing the period and phase of a carrier signal for each phase to be controlled, to the PWM signal generating unit 18 when the carrier signal for the phase reaches a peak (when the counter exhibits the maximum value; at the time corresponding to one of the black circles in FIG. 3). Upon receiving a control signal for a certain phase from the transfer processing unit 16, the PWM signal generating unit 18 loads into a buffer (not shown in the drawings) the value in the carrier period setting register for the phase. The PWM signal generating unit 18 uses the value loaded into the buffer as a threshold required to initialize the counter value in the timer counter for the phase. The above-described transfer of the control signal by the transfer processing unit 16 is hereinafter also referred to as a "transfer process." The transfer processing unit 16 can be implemented using the common timer output function of the CPU.

(2) Change in Carrier Period

During operation of the three-phase high-voltage converter, upon determining that the carrier periods of the PWM signals need to be changed based on, for example, a change in the value for the target output signal $D_{OUT}$, the control unit 12 rewrites the values in the carrier period setting registers 20u, 20v, and 20w to those corresponding to the changed periods.

Now, an example of a process of changing carrier periods will be described below with reference to a carrier signal for the U phase shown in FIG. 3. First, the control unit 12 rewrites the value in the carrier period setting register 20. In response to the first transfer process (InAU) executed on the U phase by the transfer processing unit 16 after the value in the carrier period setting register 20u for the U phase has been rewritten, the PWM signal generating unit 18 loads the rewritten value in the carrier period setting register 20u into the buffer (not shown in the drawings). Then, if the control unit 12 rewrites the value in the carrier period setting register 20u to a double value, for example, at a timing A in FIG. 3, the rewritten value is loaded into the buffer and made effective, in response to the first transfer process (InAu) after the timing A. After the transfer process InAu, the PWM signal generating unit 18 initializes the counter value for the U phase again when the counter value for the U phase reaches the rewritten value in the carrier period setting register 20u (the value that is double the unrewritten value). Thus, when the control unit 12 rewrites the current value in the carrier period setting register 20u to the double value at the timing A, the carrier period for the U phase is doubled. Moreover, if the control unit 12 rewrites the value in the carrier period setting register 20u to a double value at a timing B in FIG. 3, the rewritten value is loaded into the buffer and made effective, in response to the first transfer process (InBu) after the timing B. Hence, the carrier period for the U phase decreases to a value that is half the value obtained before the timing B. For the V and W phases, the carrier period can be changed by processing similar to that described above.

(3) Phase Differences Among PWM Signals for the Three Phases

Now, an example of a process of setting a phase difference of $2\pi/3$ between carrier signals for the three phases generated by the PWM signal generating unit 18 will be described with reference to FIG. 3.

As shown in FIG. 3, it is assumed that when the three-phase high-voltage converter starts to be driven, the values in the carrier period setting registers 20u, 20v, and 20w for the U, V, and W phases, respectively, are set so as to set each of the carrier periods to 100 μsec. In this case, when the three-phase high-voltage converter starts to be driven, the PWM signal generating unit 18 receives an instruction from the control unit 12 to allow the timer counter for the U phase to start counting (timing $ST_U$). Then, the transfer processing unit 16 generates a transfer process 66 μsec after the timing $ST_U$ to allow the PWM signal generating unit 18 to start counting in the timer counter for the V phase (timing $ST_V$). Then, 66 μsec after the timing $ST_V$, the transfer processing unit 16 generates a transfer process to allow the PWM signal generating unit 18 to start counting in the timer counter for the W phase (timing $ST_W$). When the PWM signal generating unit 18 starts counting in the timer counters for the U, V, and W phases as described above at the start of driving, a phase difference of $2\pi/3$ can be set between the W phase and the V phase and between the V phase and the U phase in the carrier signals for the respective three phases.

The example of the basic processing executed by the signal control device 10 has been described. However, the phase differences among the carrier signals for the three signals are not necessarily held after the carrier period changing process simply by executing the above-described basic processing.

For example, as shown in FIG. 3, it is assumed that in the process of changing the carrier periods for the three phases, the values in the carrier period setting registers 20u, 20v, and 20w for all the three phases are rewritten to respective double values at the timing A in order to change the carrier periods for the three phases from 100 μsec to 200 μsec. When the PWM signal generating unit 18 loads the rewritten values in the carrier period setting registers 20u, 20v, and 20w for the U, V, and W phases, respectively, into the corresponding buffers to make the value effective in response to the first transfer processes after the values in the carrier period setting registers 20u, 20v, and 20w have been rewritten, then in response to the first transfer processes (InAU, InAV, and InAW) generated for the U, V, and W phases, respectively, after the timing A, the rewritten values in the carrier period setting registers 20u, 20v, and 20w for the respective phases is made effective. In this case, as shown in FIG. 3, after the change in carrier period, the phase difference between the U phase and the V phase is $2\pi/3$. However, after the change in carrier period, the phase difference between the U phase and the W phase is $\pi/3$. This is because after the carrier period for the U phase is switchably doubled in response to the transfer process InAU, while the phase difference between the W phase and the U phase is $\pi/3$, the transfer process InAW for the W phase is generated to switchably double the carrier phase for the W phase.

As described above, simple execution of the above-described basic processing in the signal control device 10 may fail to allow the phase difference between the carrier signals for the respective three phases to be maintained at $2\pi/3$ after the carrier periods for the three phases have been changed. If the phase differences among the respective three phases are not held after a change in carrier period, the change in carrier period also prevents holding of the phase difference between the currents flowing through the phases in the three-phase high-voltage converter.

<Holding the Phase Difference After a Change in Carrier Period>

Now, an example of processing executed by the signal control device 10 will be described below; the processing is executed in order to hold, if the carrier periods of the signals for the three phases are changed, the phase differences among the carrier signals for the respective phases after the change in carrier period.

Embodiment 1

As an example of a process of holding the phase difference, in Embodiment 1, upon determining to change the carrier periods, the control unit 12 rewrites the values in the carrier period setting registers for the respective phases at timings different from those in the basic processing described above.

This allows adjustment of the timings when the changed carrier periods are made effective. Consequently, the phase differences among the carrier signals for the respective phases are held.

In Embodiment 1, for example, if the control unit 12 determines to change the carrier periods, the arithmetic unit 14 receives an instruction from the control unit 12. The arithmetic unit 14 thus determines timings for rewriting the values in the carrier period setting registers for the respective phases so that the phase differences among the carrier signals for the respective three phases are held after a change in carrier period. The arithmetic unit 14 notifies the control unit 12 of the determined rewrite timings. The control unit 12 then rewrites the values in the carrier period setting registers in accordance with the timings determined by the arithmetic unit 14.

For example, the arithmetic unit 14 determines that for the phase (in the example shown in FIG. 3, the W phase) for which the phase difference is not held after a change in carrier period based on the above-described basic processing, the value in the carrier period setting register is rewritten at a timing different from that when the values in the carrier period setting registers for the phases (in the example in FIG. 3, the U and V phases) for which the phase difference is held are rewritten. The arithmetic unit 14 then notifies the control unit 12 of the determined timing. In accordance with the notification from the arithmetic unit 14, the control unit 12 first rewrites the values in the carrier period setting registers for the phases for which the phase difference is held by the basic processing. For the phase for which the phase difference is not held by the basic processing, the control unit 12 starts a timer separate from the timer counter configured to generate carrier signals for the respective phases. Then, when the operation time of this adjusting timer indicates a point in time corresponding to the timing determined by the arithmetic unit 14, the value in the carrier period setting register for the corresponding phase is rewritten. In response to the first transfer processes executed by the transfer processing unit 16 after the values in the carrier period setting registers for the respective phases have been rewritten, the PWM signal generating unit 18 loads the rewritten values in the carrier period setting registers into the buffers (not shown in the drawings) to make the values effective.

Figure 4:
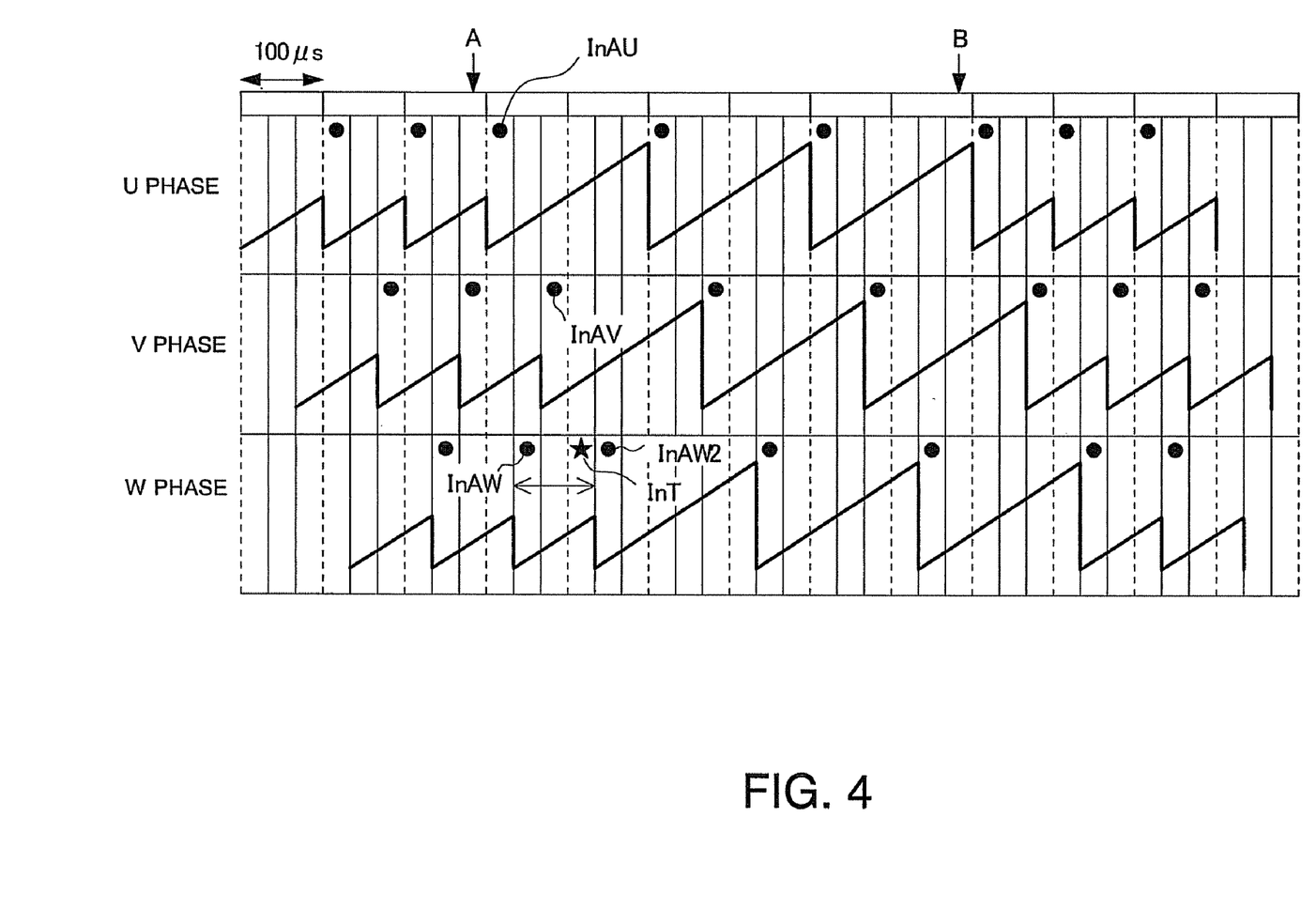
FIG. 4 is a diagram showing an example of the waveforms of carrier signals for three phases.

A specific example of processing according to Embodiment 1 will be described below with reference to FIG. 4. Carrier signals for the three phases shown in FIG. 4 are similar to those in the example shown in FIG. 3, from the start of driving to the timing A. As shown in FIG. 4, for example, it is assumed that immediately before the timing A (about 200 µsec after the start of counting in the timer counter for the U phase), the control unit 12 determines to change the carrier periods, and instructs the arithmetic unit 14 to determine the timings for rewriting the carrier period setting registers. For the U and V phases, as is the case with the above-described basic processing, the values in the carrier period setting registers are rewritten at the timing A, and the rewritten values in the carrier period setting registers 20u and 20v are made effective based on the first transfer processes InAU and InAV after the rewriting. Then, the phase difference between the carrier signals for the U and V phases is $2\pi/3$. Hence, for the U and V phases, the arithmetic unit 14 determines to rewrite the current value in the carrier period setting register to a double value at the timing A. For the W phase, if the value in the carrier period setting register 20w is rewritten at the timing A and the rewritten value is made effective based on the first transfer process InAW after the timing A as described above, the carrier period for the W phase is changed while the phase difference between the W phase and the U phase is $\pi/3$. Thus, the phase differences among the signals for the respective phase are not maintained at $2\pi/3$. Hence, in order that the changed carrier period may be made effective not in response to the first transfer process InAW after the timing A but in response to a transfer process (the second transfer process InAW2 after the timing A) generated at a point in time corresponding to a phase difference of $4\pi/3$ between the W phase and the U phase obtained after a change in carrier period, the arithmetic unit 14 determines to rewrite the value in the carrier period setting register 20w for the W phase at a point in time between the first transfer process InAW and the second transfer process InAW2 after the timing A.

In accordance with the timings determined by the arithmetic unit 14, the control unit 12 rewrites the values in the carrier period setting registers 20 for the respective values. The control unit 12 first rewrites the values in the carrier period setting registers 20u and 20v for the U and V phases to respective double values. Hence, for the U and V phases, the changed carrier periods are made effective in response to the first transfer processes InAU and InAV for the respective phases after the timing A. For the W phase, the control unit 12 starts the adjusting timer when the carrier period for the U phase is switched (in response to the transfer process InAU) in order to rewrite the value in the carrier period setting register 20w for the W phase at a point in time between the first transfer process InAW and the second transfer process InAW2 after the timing A as determined by the arithmetic unit 14. Then, when the time (in FIG. 4, 100 µsec) corresponding to the unchanged period has elapsed since the switching of the carrier period for the U phase, the control unit 12 controls the transfer processing unit 16 so that the transfer processing unit 16 generates a timer transfer process InT (a star shown in FIG. 4). In response to the timer transfer process InT, the current value in the carrier period setting register 20w is rewritten to a double value. The rewritten value in the carrier period setting register 20w is made effective in response to the first transfer process InAW2 for the W phase, which follows the timer transfer process InT and which is the second transfer process after the timing A.

As shown in FIG. 4, the processing in the above-described example sets each of the phase differences among the phases resulting from the doubling of the carrier periods; that is, the phase difference between the U phase and the V phase and the phase difference between the V phase and W phase, to $2\pi/3$. Thus, the phase difference between the carrier signals for the respective three phases is maintained at $2\pi/3$ after a change in carrier period.

The specific example in which the carrier periods are doubled has been described. A specific example in which the carrier periods are reduced by half will next be described. In the example shown in FIG. 4, it is assumed that the control unit 12 determines to reduce the carrier periods by half about 566 µsec after the timing A. This processing corresponds to returning the carrier periods for the three phases to values obtained before the timing A. In this case, for example, at a timing B, the values in the carrier period setting registers 20 for the U, V, and W phases, respectively, are rewritten to respective values corresponding to half of those obtained before the change. Then, in response to the first transfer process generated for each phase after the timing B, the changed carrier period is made effective. Thus, as shown in FIG. 4, each of the phase differences among the phases resulting from the change in carrier period; that is, the phase difference between the U phase and the V phase and the phase difference between the V phase and W phase, is set to $2\pi/3$. Hence, for the three phases, the U, V, and W phases, the arithmetic unit 14 determines to rewrite the value in each carrier period setting register 20 at the timing B. In accordance with the determination, the control unit 12 rewrites the value in each carrier period setting register 20 at the timing B. The phase differences among the U, V, and W phases are each maintained at 2π/3, also in this example.

In Embodiment 1, for one of the three phases, first, the carrier period is changed (and the changed carrier period is made effective). Thereafter, for the two phases for which the carrier period has not been changed, the arithmetic unit 14 determines timings for rewriting the values in the carrier period setting registers for the respective phases so that the carrier periods are changed when the phase differences between the respective two phases and the phase for which the carrier period has been changed reach 2π/3 and 4π/3. First, if the operation of rewriting the value in the carrier period setting register and making the rewritten value effective is first performed on one of the three phases, then for the phase for which a transfer process is generated before the phase difference between each of the remaining two phases and the phase for which the carrier period has been changed reaches 2π/3 or 4π/3, the arithmetic unit 14 determines an operation time for the adjusting timer and allows the operation of rewriting the value in the carrier period setting register to stand by. The length of the standby time; that is, the operation time for the adjusting timer, is determined depending on which of the transfer processes after a change in carrier period for the phase for which the changed carrier period is first made effective.

For example, in the example shown in FIG. 4, for the W phase, the carrier period is changed in response to the second transfer process InAW2 after a change in the carrier period for the U phase. Hence, the operation of rewriting the value in the carrier period setting register 20w stands by until the first transfer process InAW after the change in the carrier period for the U phase is finished. Thus, the value in the carrier period setting register 20w is rewritten before the second transfer process InAW2 is executed. Consequently, the operation time for the adjusting timer is set to a value corresponding to the unchanged period. This is because, provided that the rewriting operation stands by for a time corresponding to one unchanged period, a timer transfer process can be generated between the first transfer process and the second transfer process. Furthermore, for example, if the value in the carrier period setting register is rewritten at a point in time between the second transfer process and the third transfer process after a change in carrier period, the operation of rewriting the value in the carrier period setting register has only to standby for a time corresponding to two unchanged periods. Hence, in this case, the operation time of the adjusting timer may be set to a value that is about double that of the unchanged carrier period. More generally speaking, if the value in the carrier period setting register is rewritten at a point in time between the kth transfer process and the k+1th transfer process after a change in the carrier period for the U phase, the operation time of the adjusting timer may be set to a value that is k times that of the unchanged period.

An example of the procedure of a process will be described below with reference to FIG. 5; the process involves rewriting the values in the carrier period setting registers for the respective phases, and is executed by the control unit 12 in order to double the carrier periods or reduce the carrier periods by half.

Figure 5:
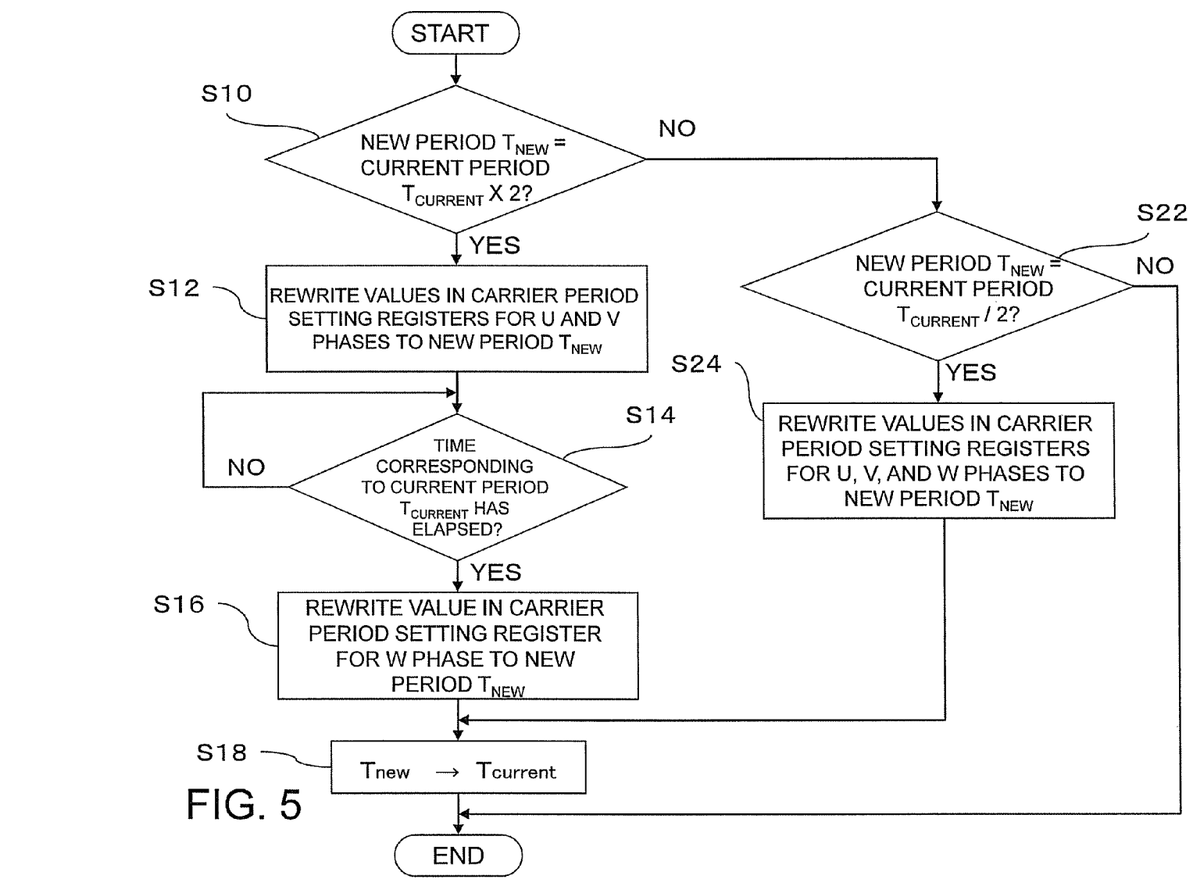
FIG. 5 is a flowchart showing an example of the procedure of a process of rewriting values in carrier period setting registers for three phases.

Upon determining to change the carrier periods, the control unit 12 starts the process according to the procedure illustrated in FIG. 5. First, the control unit 12 determines whether or not the changed carrier period (new period $T_{new}$) is double the current period $T_{current}$ (step S10).

If the new period $T_{new}$ is double the current period $T_{current}$ (YES in step S10), the control unit 12 rewrites the values in the carrier period setting registers 20u and 20v for the U and V phases to $T_{new}$ (step S12). Then, the control unit 12 determines whether or not a time corresponding to one current period $T_{current}$ has elapsed since the execution of the processing in step S12 (step S14). If the time has elapsed, the control unit 12 proceeds to step S16. If the time has not elapsed, the control unit repeats the determination in step S14. In step S16, the control unit 12 rewrites the value in the carrier period setting register 20w for the W phase to the new period $T_{new}$.

When the processing in step S16 is finished, the values in the carrier period setting registers for all of the U, V, and W phases are rewritten to the new period $T_{new}$. The control unit 12 stores the value of the new period $T_{new}$ in a storage device (not shown in the drawings) as the current period $T_{current}$ (step S18). Then, the process according to the procedure illustrated in FIG. 5 is finished.

If the new period $T_{new}$ is not double the current period $T_{current}$ (NO in step S10), the control unit 12 determines whether or not the new period $T_{new}$ is half the current period $T_{current}$ (step S22).

If the new period $T_{new}$ is half the current period $T_{current}$ (YES in step S22), the control unit 12 rewrites the values in the carrier period setting registers 20u, 20v, and 20w for all of the U, V, and W phases to the new period $T_{new}$ (step S24). After step S24, in step S18, the control unit 12 stores the value of the new period $T_{new}$ in the storage device (not shown in the drawings) as the current period $T_{current}$ (step S18). Then, the process is finished.

If the new period $T_{new}$ is not half the current period $T_{current}$ (NO in step S22), the control unit 12 finishes the process.

In the process according to the procedure illustrated in FIG. 5, the values in the carrier period setting registers for the respective three phases are rewritten, and, as is the case with the above-described basic processing, the value in the carrier period setting register for each phase is made effective in response to the first transfer process after the value in the carrier period setting register has been rewritten. Thus, the phase difference between the carrier signals for the respective three phases is maintained at 2π/3 after a change in carrier period. For example, as shown in FIG. 4, the values in the carrier period setting registers are rewritten by the process according to the procedure illustrated in FIG. 5, at the timing A (the carrier period is doubled) and the timing B (the carrier period is reduced by half). Then, the carrier signals for the U, V, and W phases vary as shown in FIG. 4. The phase difference between the carrier signals for the respective phases is maintained at 2π/3.

In the process according to the procedure illustrated in FIG. 5, if the carrier periods are doubled, the rewriting of the values in the carrier period setting registers for all of the three phases can be finished simply by executing the process of rewriting the value in each carrier period setting register twice (steps S12 and S16). Furthermore, when a time corresponding to one current carrier period has elapsed since the first process of rewriting the values in the carrier period setting registers (step S12), the second process of rewriting the value in each carrier period setting register is executed (step S16). Thus, the value in each carrier period setting register can be rewritten by the process according to the current carrier period. This enables the carrier periods to be changed with the phase difference between the carrier signals held and with a CPU load that is lighter than that in the case where the value in each carrier period setting register is rewritten at a timing according to a period shorter than the current carrier period.

The processing by the control unit 12 described above with reference to FIG. 5 can be considered to be executed according to the timing for rewriting the value in the carrier period setting register, which timing has been determined by the arithmetic unit 14. To double the carrier periods, the arithmetic unit 14 determines timings for rewriting the values in the carrier period setting registers such that first, the values in the carrier period setting registers for two of the three phases are rewritten and such that when a time corresponding to one unchanged period has elapsed, the value in the carrier period setting register for the remaining one phase is rewritten. Furthermore, to reduce the carrier periods by half, the arithmetic unit 14 determines timings for rewriting the values in the carrier period setting registers such that the values in the carrier period setting registers for all of the three phases are rewritten simultaneously. The process according to the procedure illustrated in FIG. 5 is executed by the control unit 12 in accordance with the determination by the arithmetic unit 14.

Embodiment 2

Instead of using different rewrite timings for the value in the carrier period setting register for the phase for which the phase difference is held by the basic processing and for the value in the carrier period setting register for the phase for which the phase difference is not held by the basic processing, the signal control device 10 may execute a transfer process at different timings for the respective phases to adjust timings for making the changed carrier periods effective, thus holding the phase differences among the respective phases. An example of the processing according to Embodiment 2 in which the transfer process is executed at different timings for the respective phases will be described.

In Embodiment 2, for example, if the control unit 12 determines to change the carrier periods, the arithmetic unit 14 receives an instruction from the control unit 12. The arithmetic unit 14 thus determines timings at which the transfer processing unit 16 executes a transfer process on each of the phases of the PWM signal generating unit 18 so that the phase differences among the carrier signals for the respective three phases are held after a change in carrier period. The arithmetic unit 14 notifies the control unit 12 of the determined rewrite timings. The control unit 12 then controls the transfer control unit 16 in accordance with the timings determined by the arithmetic unit 14, in order to transfer to each phase a control signal for controlling the period and phase.

An example of timings for transfer processes determined by the arithmetic unit 14 will be described with reference to FIG. 6; in this case, carrier signals for three phases are generated as in the case of the example shown in FIG. 3, and the current values in the carrier period setting registers for all of the U, V, and W phases are rewritten to double values. For the U and V phases, a transfer process is generated at the timing (the point of the peak of the carrier signal) for the transfer process according to the basic processing described above. The rewritten values in the carrier period setting registers 20u and 20v are then made effective in response to the first transfer processes InAU and InAV, respectively, after the timing A. Then, the phase difference between the carrier signals for the U and V phases resulting from the change in carrier period is $2\pi/3$. Hence, for the U and V phases, the arithmetic unit 14 determines to generate a transfer process at the point of the peak of the carrier signal as is the case with the basic processing. For the W phase, the arithmetic unit 14 determines to generate a carrier signal with the unchanged carrier signal maintained without generating a transfer process at the first point in time (InAW) when the carrier signal reaches a peak after the timing A when the value in the carrier period setting register 20w has been rewritten. A transfer process InAW2 is then generated at the second point in time when the carrier signal reaches a peak, to make the value in the carrier period setting register 20w effective. Then, the phase difference between the U phase and the W phase is set to $4\pi/3$. Thus, the phase differences among the U, V, and W phases are each maintained at $2\pi/3$. Consequently, the arithmetic unit 14 determines to generate a transfer process at the second point of the peak of the carrier signal for the W phase after the value in the carrier period setting register 20w has been rewritten. That is, for the W phase, as compared with the basic processing, the processing according to Embodiment 2 omits generation of one transfer process after the timing A.

Figure 6:
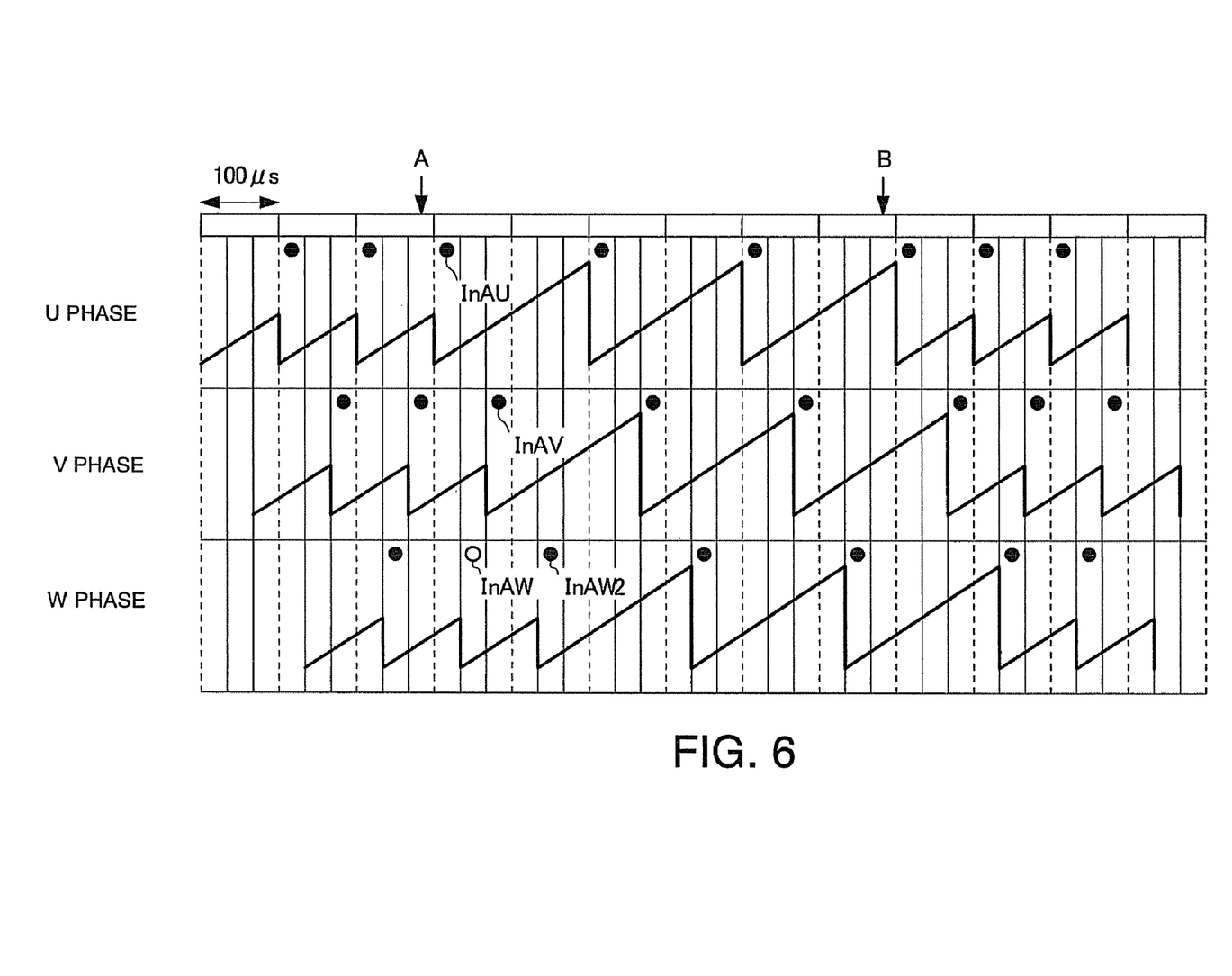
FIG. 6 is a diagram showing an example of the waveforms of carrier signals for three phases.

Omitting a transfer process otherwise executed at the point of the peak of the carrier signal as in the processing for the W phase described with reference to FIG. 6 is called "decimation" of a transfer process. The CPU may provide the function of "decimating" a specified number of transfer processes if the CPU is set to execute a transfer process with a constant period. A CPU providing such a "transfer decimation function" includes, for example, a decimation number setting register in which the number of times that a transfer process executed with a constant period is omitted (decimated) is set. In this case, the CPU provides the function of omitting an otherwise executed transfer process a number of times set in the decimation number setting register. Processing with transfer processes decimated such as the processing for the W phase described with reference to FIG. 6 can be implemented using the "transfer decimation function" of the CPU.

As illustrated in FIG. 6, if the carrier periods of PWM signals for three phases are doubled, the phase difference between the carrier signals can be maintained at $2\pi/3$ by executing a process of decimating one transfer process for the W phase after the carrier periods for the three phases have been changed. A method used to change the carrier periods by a factor of (n) will be described below in which the arithmetic unit 14 determines timings for transfer processes for the respective phases in order to maintain the phase difference between the carrier signals for the three phases at $2\pi/3$.

In the description below, the carrier signals for the three phases are assumed to be in an $l_0$ phase, an $l_1$ phase, and an $l_2$ phase, respectively. It is assumed that before the carrier periods are changed, a phase difference of $2\pi/3$ has been established between the $l_0$ phase and the $l_1$ phase and between the $l_1$ phase and the $l_2$ phase. In the example shown in FIG. 1, the U, W, and V phases correspond to the $l_0$, $l_1$, and $l_2$ phases, respectively. Here, the phases of the signals for the $l_0$, $l_1$, and $l_2$ phases are defined as $\theta_0$, $\theta_1$, and $\theta_2$, respectively. Then, before the change in carrier period, the phase difference between the $l_0$ phase and the $l_1$ phase is $\theta_0-\theta_1=2\pi/3$. Before the change in carrier period, the phase difference between the $l_0$ phase and the $l_2$ phase is $\theta_0-\theta_2=4\pi/3$.

When the carrier periods for the three phases are changed, for the $l_0$ phase, after a change in carrier period, as is the case with the basic processing, a transfer process is generated at the point of the peak of the carrier signal. Then, the changed carrier period is made effective in response to the first transfer process after the change in carrier period.

Figure 7:
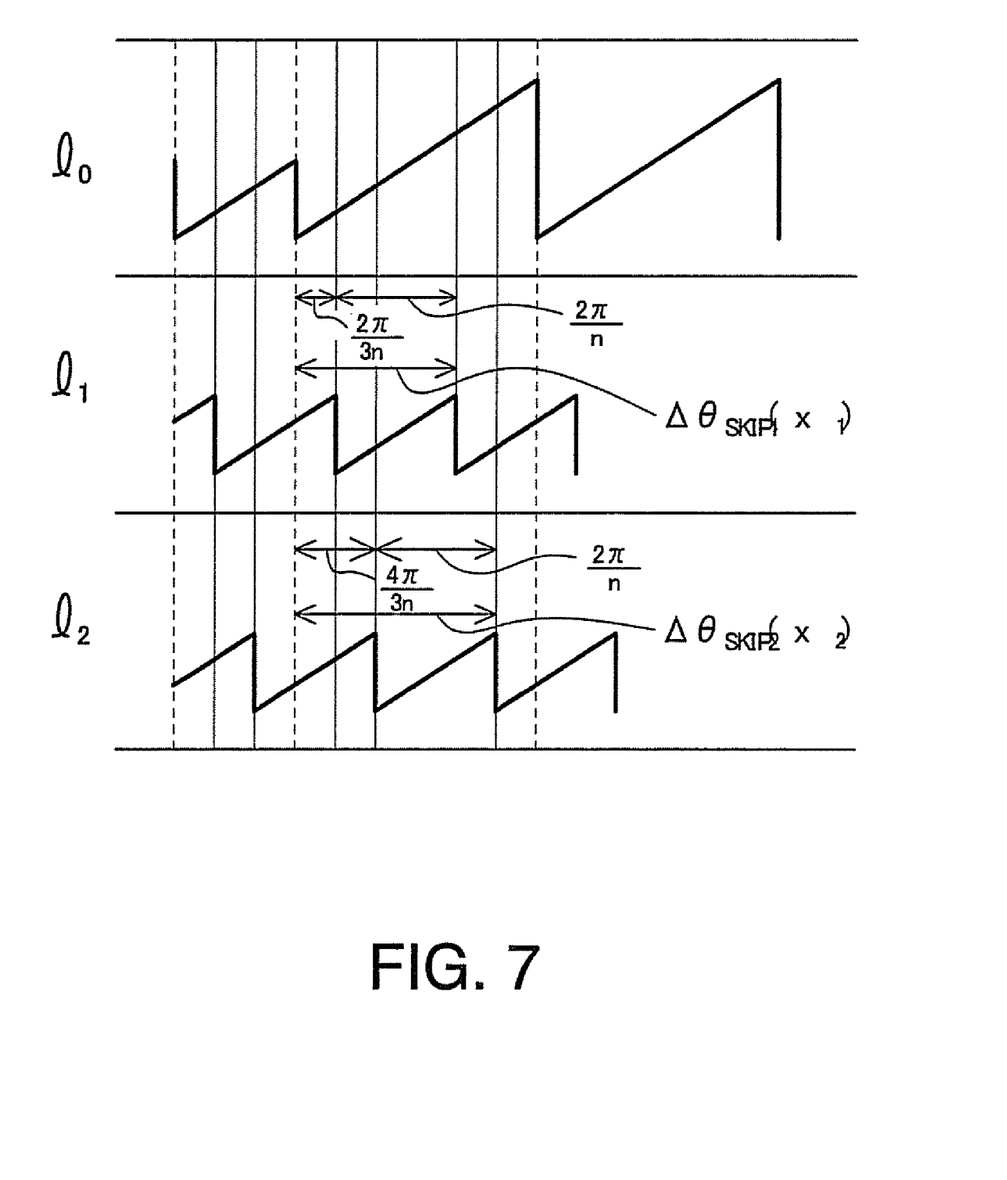
FIG. 7 is a diagram showing an example of phase differences among carrier signals resulting from a change in a carrier period.

FIG. 7 shows an example of the phase differences among the phases resulting from a change in the carrier period for the $l_0$ phase by a factor of (n). As shown in FIG. 7, after the carrier period for the $l_0$ phase is changed by a factor of (n), the phase for the $l_0$ phase reaches $\theta_0=2\pi/3n$ when the phase for the $l_1$ phase first reaches $\theta_1=0$. When the carrier period for the $l_0$ phase is changed by a factor of (n) with the carrier period for the $l_1$ phase unchanged, the $l_0$ phase advances by $2\pi/n$ while the $l_1$ phase is going through one period. Thus, if $x_1$ transfer processes for the $l_1$ phase are decimated, the phase difference $\Delta\theta_{skip1}(x_1)$ between the $l_0$ phase and the $l_1$ phase resulting from the decimation is as shown in:

[Expression (1)]

$$\Delta\theta_{skip1}(x_1) = \theta_0 - \theta_1 = \frac{2\pi}{3n} + \frac{2\pi}{n}x_1 \qquad (1)$$

Similarly, as shown in FIG. 7, after the carrier period for the $l_0$ phase is changed by a factor of (n), the phase for the $l_0$ phase reaches $\theta_0=4\pi/3n$ when the phase for the $l_2$ phase first reaches $\theta_2=0$. When the carrier period for the $l_0$ phase is changed by a factor of (n) with the carrier period for the $l_2$ phase unchanged, the $l_0$ phase advances by $2\pi/n$ while the $l_2$ phase is going through one period. Thus, if $x_2$ transfer processes for the $l_2$ phase are decimated, the phase difference $\Delta\theta_{skip2}(x_2)$ between the $l_0$ phase and the $l_2$ phase resulting from the decimation is as shown in:

[Expression (2)]

$$\Delta\theta_{skip2}(x_2) = \theta_0 - \theta_2 = \frac{4\pi}{3n} + \frac{2\pi}{n}x_2 \qquad (2)$$

The condition in Expression (3) or (4) for the phase differences $\Delta\theta_{skip1}(x_1)$ and $\Delta\theta_{skip1}(x_1)$ for the $l_1$ and $l_2$ phases, respectively, may be met in order to maintain the phase difference between the carrier signals for the three phases at $2\pi/3$ after $x_1$ transfer processes for the $l_1$ phase and $x_2$ transfer processes for the $l_2$ phase have been decimated.

[Expression (3)]

$$\begin{cases} \Delta\theta_{skip1}(x_1) = \frac{2\pi}{3} + 2\pi m_1 \\ \Delta\theta_{skip2}(x_2) = \frac{4\pi}{3} + 2\pi m_2 \end{cases} \qquad (3)$$

[Expression (4)]

$$\begin{cases} \Delta\theta_{skip1}(x_1) = \frac{4\pi}{3} + 2\pi m_1 \\ \Delta\theta_{skip2}(x_2) = \frac{2\pi}{3} + 2\pi m_2 \end{cases} \qquad (4)$$

In Expressions (3) and (4), each of $m_1$ and $m_2$ denotes an integer of at least zero.

If the condition in Expression (3) is met, the following processing is executed. After $x_1$ and $x_2$ transfer processes for the $l_1$ and $l_2$ phases, respectively, are decimated, the carrier periods for the three phases are all changed. Then, a phase difference of $2\pi/3$ is established between the $l_0$ phase and the $l_1$ phase and between the $l_1$ phase and the $l_2$ phase in the same manner as before the change in carrier period.

If the condition in Expression (4) is met, the following processing is executed. After $x_1$ and $x_2$ transfer processes for the $l_1$ and $l_2$ phases, respectively, are decimated, the carrier periods for the three phases are all changed. Then, the order of the phase difference between the $l_1$ phase and the $l_2$ phase is changed as compared to that before a change in carrier period.

That is, a phase difference of $2\pi/3$ is established between the $l_0$ phase and the $l_2$ phase and between the $l_2$ phase and the $l_1$ phase.

Expressions (1) and (2) are substituted into Expression (3) to determine the numbers $x_1$ and $x_2$ of decimated transfer processes for the $l_1$ and $l_2$ phases, respectively, as shown in:

[Expression (5)]

$$\begin{cases} x_1 = \frac{(1+3m_1)n-1}{3} \\ x_2 = \frac{(2+3m_2)n-2}{3} \end{cases} \qquad (5)$$

Expressions (1) and (2) are substituted into Expression (4) to determine the numbers $x_1$ and $x_2$ of decimated transfer processes for the $l_1$ and $l_2$ phases, respectively, as shown in:

[Expression (6)]

$$\begin{cases} x_1 = \frac{(2+3m_1)n-1}{3} \\ x_2 = \frac{(1+3m_2)n-2}{3} \end{cases} \qquad (6)$$

Since the numbers $x_1$ and $x_2$ of decimated transfer processes for the $l_1$ and $l_2$ phases, respectively, are integers of at least zero, a set of values for n, $m_1$, and $m_2$ in Expression (5) or (6) is selected such that both $x_1$ and $x_2$ are integers of at least zero. Then, when $x_1$ and $x_2$ transfer processes for the $l_1$ and $l_2$ phases, respectively, are decimated, the phase difference between the carrier signals for the respective three phases is maintained at $2\pi/3$ after the carrier periods have been changed by a factor of (n).

In Expression (5), given that $m_1=m_2=0$, then $x_1=(n-1)/3$ and $x_2=2(n-1)/3$. Consequently, if $m_1=m_2=0$, then $x_1=k$ and $x_2=2k$ provided that $n=3k+1$ (k is an integer of at least zero). That is, both $x_1$ and $x_2$ are integers of at least zero.

Thus, if the carrier periods are changed by a factor of $n=3k+1$, when $x_1=k$ transfer processes for the $l_1$ phase and $x_2=2k$ transfer processes for the $l_2$ phase are decimated, the phase difference between the phases is maintained at $2\pi/3$ after the change in carrier period.

In Expression (6), given that $m_1=m_2=0$, then $x_1=(2n-1)/3$ and $x_2=(n-2)/3$. Consequently, if $m_1=m_2=0$, then $x_1=2k+1$ and $x_2=k$ provided that $n=3k+2$ (k is an integer of at least zero). That is, both $x_1$ and $x_2$ are integers of at least zero.

Thus, if the carrier periods are changed by a factor of $n=3k+2$, when $x_1=2k+1$ transfer processes for the $l_1$ phase and $x_2=k$ transfer processes for the $l_2$ phase are decimated, the phase difference between the phases is maintained at $2\pi/3$ after the change in carrier period.

Furthermore, the periods of the carrier signals may be controlled such that the carrier periods are changed by a factor of (n) and then returned to unchanged values, for example, as in the processing executed at the timing B in FIG. 6. In this case, at the timing B, processing is executed such that the carrier periods are changed by a factor of $1/n$.

Also when the carrier periods are changed by a factor of $1/n$, the numbers $x_1$ and $x_2$ of decimated transfer processes for the $l_1$ and $l_2$ phases, respectively, can be calculated in accordance with Expression (5) or (6). For example, if the carrier periods are changed at the timing A in FIG. 6 with $n=3k+1$, when the carrier periods are changed at the timing A in FIG.

6 with n=3k+1, the carrier periods return to the values obtained at the start of driving. If n=1/(3k+1), the numbers $x_1$ and $x_2$ of decimated transfer processes for the $l_1$ and $l_2$ phases, respectively, can be calculated in accordance with Expression (5), as shown in:

[Expression (7)]

$$\begin{cases} x_1 = \dfrac{m_1 - k}{3k + 1} \\ x_2 = \dfrac{m_2 - 2k}{3k + 1} \end{cases} \quad (7)$$

According to Expression (7), given that $m_1$=k and $m_2$=2k, then $x_1$=$x_2$=0. Thus, if n=1/(3k+1), a transfer process is executed at the point of the peak of the carrier signal as is the case with the basic processing without decimation of transfer processes for the $l_1$ and $l_2$ phases. This allows a phase difference of $2\pi/3$ to be maintained for the phase difference between the carrier signals for the three phases.

Similarly, if n=1/(3k+2), the numbers $x_1$ and $x_2$ of decimated transfer processes for the $l_1$ and $l_2$ phases, respectively, can be calculated in accordance with Expression (6), as shown in:

[Expression (8)]

$$\begin{cases} x_1 = \dfrac{m_1 - k}{3k + 2} \\ x_2 = \dfrac{m_2 - 2k - 1}{3k + 2} \end{cases} \quad (8)$$

According to Expression (8), given that $m_1$=k and $m_2$=2k+1, then $x_1$=$x_2$=0. Thus, also when n=1/(3k+2), a phase difference of $2\pi/3$ can be maintained for the phase difference between the carrier signals for the three phases by executing the transfer processes without decimation.

The process of "decimating (i) transfer processes" which is executed in the carrier period changing process according to Embodiment 2 described above can be expressed in a different way. That is, in the process of "decimating (i) transfer processes", "the first transfer process after a change in carrier period is generated with a period that is i+1 times as large as that of an unchanged transfer process generation period (unchanged carrier period)." That is, if (i) transfer processes are decimated, the first transfer process after a change in carrier period is generated with a period that is i+1 times as large as that of the unchanged carrier period. The second and subsequent transfer processes after the change in carrier period are generated with the period of the changed carrier period. Furthermore, if no transfer process is decimated, then first transfer process after a change in carrier period is generated with the period of the unchanged carrier period. The second and subsequent transfer processes after the change in carrier period are generated with the period of the changed carrier period.

The above-described embodiments will be described below in a more generalized manner.

An aspect of the present invention provides a signal control device configured to control periods of signals for three phases used to control a three-phase high-voltage converter, the apparatus including an arithmetic unit which, when the period of each of the signals for the respective three phases is changed, determines a timing at which the period of the signal is changed based on the ratio of the changed period to the unchanged period, the arithmetic unit determining the timing for each of the three phases such that after the signal for a first phase of the three phases is changed, when a phase difference between the signal for the first phase and a signal for a second phase of the three phases or a signal for a third phase of the three phases reaches a predetermined value, the period of the signal for the second or third phase is changed, and a control unit which performs control such that the period of the signal for each of the three phases is changed at the timing determined by the arithmetic unit.

In the signal control device according to the aspect of the present invention, the changed period may be double the unchanged period.

In the signal control device according to the aspect of the present invention, the arithmetic unit may determine the timings for the respective three phases such that the period of the signal for the first phase is changed to the changed period, and then when the phase difference between the signal for the first phase and the signal for the second phase reaches $2\pi/3$, the signal for the second phase is changed to the changed period, and then when the phase difference between the signal for the first phase and the signal for the third phase reaches $4\pi/3$, the signal for the third phase is changed to the changed period.

In the signal control device according to the aspect of the present invention, if the changed period is double the unchanged period, the arithmetic unit may determine the timings such that the periods of the signals for the first and second phases are changed to the changed period, and when a time corresponding to one unchanged period has elapsed since the change, the period of the signal for the third phase is changed to the changed period.

Another aspect of the present invention provides a signal control device configured to control periods of signals for three phases used to control a three-phase high-voltage converter, the apparatus including an arithmetic unit which, when the period of each of the signals for the respective three phases is changed, determines a timing at which the period of the signal is changed based on the ratio of the changed period to the unchanged period, and a control unit which performs control such that the period of each of the signals for the respective three phases is changed at the timing determined by the arithmetic unit, wherein if before the change in signal period, a phase difference between a first phase of the three phases and a second phase of the three phases is $2\pi/3$ and a phase difference between the first phase and a third phase of the three phases is $4\pi/3$ and if the changed period is double the unchanged period, the arithmetic unit determines the timings for the respective three phases such that the period of the signal for the first phase is changed to the changed period, and then when the phase difference between the signal for the first phase and the signal for the third phase reaches $2\pi/3$, the signal for the third phase is changed to the changed period, and then when the phase difference between the signal for the first phase and the signal for the second phase reaches $4\pi/3$, the signal for the second phase is changed to the changed period.

Each of the above-described various embodiments provides a signal control device configured to control signals for three phases used to control a three-phase high-voltage converter. In the signal control device, when the periods of the signals for the respective three phases are changed, the phase difference between the signals for the respective three phases can be held.

DESCRIPTION OF REFERENCE NUMERALS

10 Signal control device, 12 Control unit, 14 Arithmetic unit, 16 Transfer processing unit, 18 PWM signal generating unit, 20*u*, 20*v*, and 20*w* Carrier period setting registers, 22 Three-phase high-voltage converter, 24 DC power source, 26 Load.

The invention claimed is:

1. A signal control device configured to control periods of signals for three phases used to control a three-phase high-voltage converter, the apparatus comprising:
   an arithmetic unit configured to determine a timing at which the period of each of the signals for the respective three phases is changed, the arithmetic unit determining the timing for each of the three phases such that after the signal for a first phase of the three phases is changed, when a phase difference between the signal for the first phase and a signal for a second phase of the three phases or a signal for a third phase of the three phases reaches a predetermined value, the period of the signal for the second or third phase is changed; and
   a control unit configured to perform control such that the period of the signal for each of the three phases is changed at the timing determined by the arithmetic unit.

2. The signal control device according to claim 1, wherein the changed period is double the unchanged period.

3. The signal control device according to claim 2, wherein the arithmetic unit determines the timings for the respective three phases such that the period of the signal for the first phase is changed to the changed period, and then when the phase difference between the signal for the first phase and the signal for the second phase reaches $2\pi/3$, the signal for the second phase is changed to the changed period, and then when the phase difference between the signal for the first phase and the signal for the third phase reaches $4\pi/3$, the signal for the third phase is changed to the changed period.

4. The signal control device according to claim 2, wherein the arithmetic unit determines the timings such that the periods of the signals for the first and second phases are changed to the changed period, and when a time corresponding to one unchanged period has elapsed since the change, the period of the signal for the third phase is changed to the changed period.

5. A signal control device configured to control periods of signals for three phases used to control a three-phase high-voltage converter, the apparatus comprising:
   an arithmetic unit configured to determine a timing at which the period of each of the signals for the respective three phases is changed; and
   a control unit configured to perform control such that the period of each of the signals for the respective three phases is changed at the timing determined by the arithmetic unit,
   wherein if before the change in signal period, a phase difference between a first phase of the three phases and a second phase of the three phases is $2\pi/3$ and a phase difference between the first phase and a third phase of the three phases is $4\pi/3$ and if the changed period is double the unchanged period,
   the arithmetic unit determines the timings for the respective three phases such that the period of the signal for the first phase is changed to the changed period, and then when the phase difference between the signal for the first phase and the signal for the third phase reaches $2\pi/3$, the signal for the third phase is changed to the changed period, and then when the phase difference between the signal for the first phase and the signal for the second phase reaches $4\pi/3$, the signal for the second phase is changed to the changed period.

\* \* \* \* \*